(12) United States Patent
L'Henaff et al.

(10) Patent No.: US 12,473,720 B2
(45) Date of Patent: Nov. 18, 2025

(54) PROGRAMMABLE BASIN FAUCET

(71) Applicant: AS America, Inc., Piscataway, NJ (US)

(72) Inventors: Jean-Jacques L'Henaff, New Canaan, CT (US); Jacob Nitz, London (GB); Ki Bok Song, Plainview, NY (US); Paul Flowers, London (GB); Greg Reinecker, Brooklyn, NY (US)

(73) Assignee: AS America, Inc., Piscataway, NJ (US)

( * ) Notice: Subject to any disclaimer, the term of this patent is extended or adjusted under 35 U.S.C. 154(b) by 79 days.

(21) Appl. No.: 18/689,763

(22) PCT Filed: Sep. 8, 2022

(86) PCT No.: PCT/US2022/076145
§ 371 (c)(1),
(2) Date: Mar. 6, 2024

(87) PCT Pub. No.: WO2023/039496
PCT Pub. Date: Mar. 16, 2023

(65) Prior Publication Data
US 2024/0384514 A1 Nov. 21, 2024

Related U.S. Application Data

(60) Provisional application No. 63/242,834, filed on Sep. 10, 2021.

(51) Int. Cl.
*E03C 1/05* (2006.01)
*E03C 1/04* (2006.01)

(52) U.S. Cl.
CPC ............ *E03C 1/055* (2013.01); *E03C 1/0404* (2013.01)

(58) Field of Classification Search
CPC .......... E03C 1/055; E03C 1/0404; A47K 1/04
USPC ............................................................. 4/623
See application file for complete search history.

(56) References Cited

U.S. PATENT DOCUMENTS

| | | | |
|---|---|---|---|
| 8,549,678 B2 | 10/2013 | Neidich | |
| 2005/0251906 A1 | 11/2005 | Scott | |
| 2007/0246550 A1* | 10/2007 | Rodenbeck | G05D 23/1393 236/12.11 |
| 2009/0050209 A1* | 2/2009 | Rautavuori | E03C 1/057 137/624.11 |
| 2009/0106891 A1 | 4/2009 | Klicpera | |
| 2011/0114187 A1 | 5/2011 | Sawaski | |
| 2015/0308084 A1 | 10/2015 | Thompson et al. | |

* cited by examiner

*Primary Examiner* — Lauren A Crane
(74) *Attorney, Agent, or Firm* — Morrison & Foerster LLP

(57) ABSTRACT

Provided are programmable basin faucets comprising a face configured to be disposed on a side wall of a basin and comprising a user input device configured to detect a user input indicating one or more of a set temperature. a water volume, or a set time: and one or more processors communicatively coupled to the user input device and configured to receive a signal indicating the user input and to responsively, based on the user input, cause one or more valves to be actuated such that water is dispensed from a water outlet of the faucet in accordance with the one or more of the set temperature. the water volume. or the set time, wherein the faucet is configured to be moveable between a first position and a second position with respect to the side wall of the basin.

20 Claims, 5 Drawing Sheets

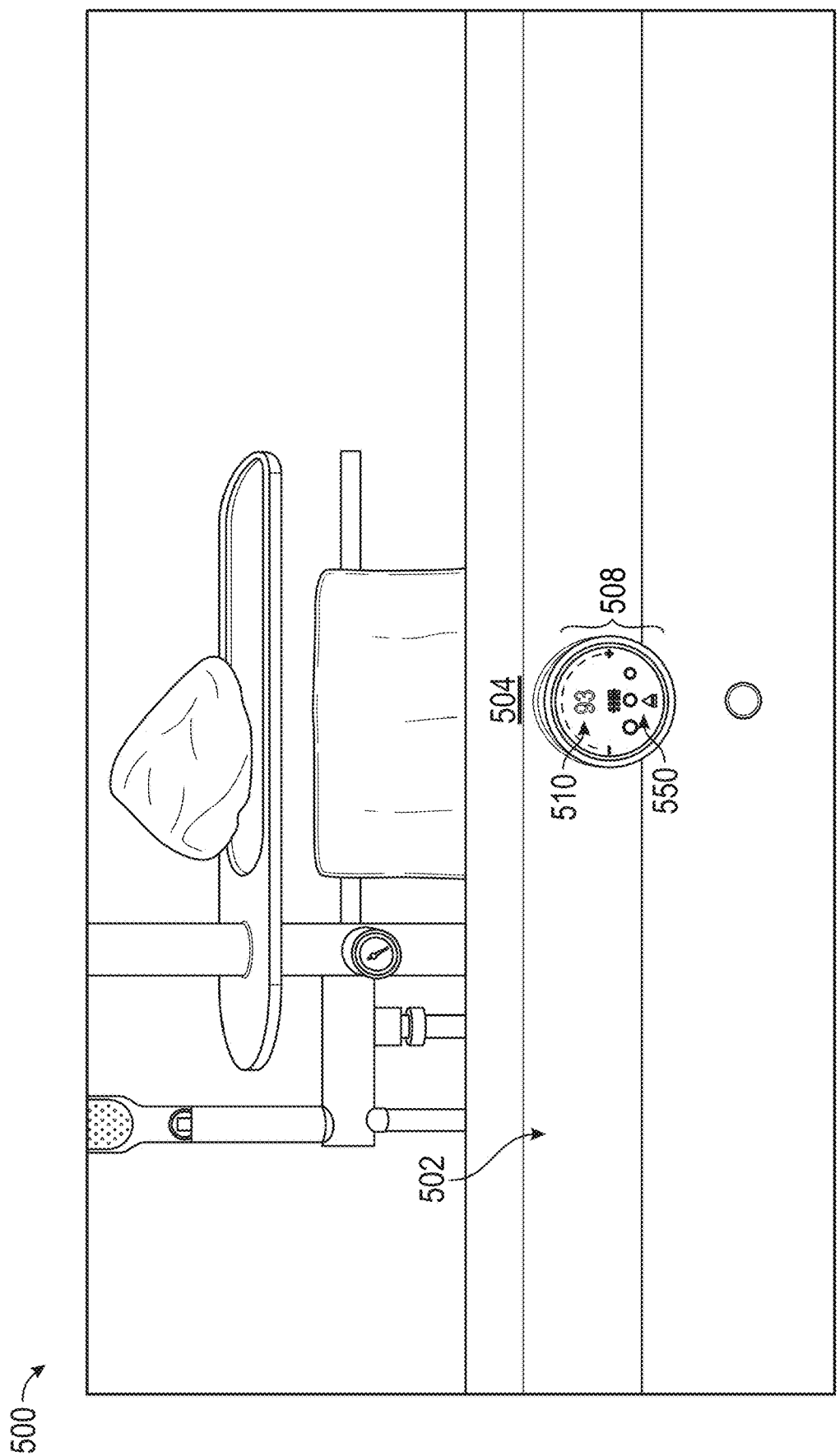

PROGRAMMABLE BASIN FAUCET

CROSS-REFERENCE TO RELATED APPLICATIONS

This application is a U.S. national stage application under 35 U.S.C. § 371 of International Application No. PCT/US2022/076145, filed internationally on Sep. 8, 2022, which claims the benefit of U.S. Provisional Application No. 63/242,834, filed Sep. 10, 2021. The entire contents of each priority application is incorporated herein by reference.

FIELD

The present disclosure generally relates to basin faucets, and in particular, to programmable basin faucets that can control the water temperature, water fill volume, and/or the time of tub fill.

BACKGROUND

Conventional basin faucets deliver water from a hot water supply and a cold water supply into a bathtub. Conventional basin faucets control the temperature of the distributed water (i.e., water that is delivered to the basin) using a mixing valve that is controlled by a user. Thus, the amount of hot water that enters a mixing chamber is manually controlled by a user relative to the amount of cold water. Additionally, the water volume in the basin must also be manually managed by a user of a conventional basin faucet. Specifically, a user must turn the faucet on, wait and watch for the basin to fill to a desired fill volume, and then manually turn the faucet off.

SUMMARY

Provided herein are basins (e.g., bathtubs) comprising a programmable basin faucet configured to control a water temperature, a water fill volume, and/or a time at which the basin faucet dispenses water to the tub. Also provided are programmable basin faucets that may be installed in an existing bathtub or basin, in place of a conventional basin faucet. In some embodiments, programmable basin faucets and basins comprising programmable basin faucets can control the temperature of the water dispensed to the basin, the volume of water that is used to fill the bathtub, and/or the time at which the programmable tub faucet initiates a tub fill, each in accordance with a user input.

For example, a user can, using a control on a face of the programmable basin faucet, select a water temperature. For example, the user may be able to select a desired water temperature of between 80 and 120° F. The programmable basin faucet may be configured to control the amount of hot water from a hot water supply and the amount of cold water from a cold water supply to achieve the set water temperature. In some embodiments, a user may be able to remotely control the water temperature using an application on a personal computing device.

A user may also be able to select, via a control on a face of the programmable basin faucet, a desired water volume by selecting one of a plurality of pre-set water fill volumes. For example, the plurality of pre-set fill volumes may include a low, medium, and high fill volume. The low fill volume may fill less than 50% of the bathtub, the medium fill volume may fill 30-70% of the bathtub, and the high fill volume may fill the bathtub more than 60% of the bathtub.

In some embodiments, a user may be able to remotely control the fill volume using an application on a personal computing device.

Further, a user may be able to control the time at which the programmable basin faucet may fill a tub with water. In some embodiments, a user may be able to select, via a control on the face of the programmable basin faucet, a time at which the programmable faucet is to fill the bathtub. In some embodiments, a user may be able to select a time at which the programmable basin faucet is to fill the basin using an application on a personal computing device.

In some embodiments, the controls on a face of the programmable basin faucet are provided using a capacitive touch screen. Further, the programmable basin faucet may be configured to wirelessly connect to a personal computing device (e.g., smartphone, laptop, tablet) to enable a user to remotely control the faucet.

Note that as used herein, the term "fill" as used with reference to filling a tub with water does not necessarily mean completely fill the basin with water (i.e., 100% full). In some embodiments, filling a basin with a programmable basin faucet as explained here may include filling the basin anywhere between 1 and 100% full.

In some embodiments, a programmable basin faucet is provided, the programmable basin faucet comprising: a face configured to be disposed on a side wall of a basin such that the face faces an interior of the basin, wherein the face comprises a user input device configured to detect a user input indicating one or more of a set temperature, a water volume, or a set time; and one or more processors communicatively coupled to the user input device and configured to receive a signal indicating the user input and to responsively, based on the user input, cause one or more valves to be actuated such that water is dispensed from a water outlet of the faucet in accordance with the one or more of the set temperature, the water volume, or the set time, wherein the faucet is configured to be moveable between a first position and a second position with respect to the side wall of the basin, wherein, in the first position, the face is co-planar with a portion of the side wall of the basin, and, in the second position, the face is proud of the portion of the side wall and a circumferential side surface of the faucet extends inwardly from the portion of the side wall into the interior of the basin, the circumferential side surface comprising the water outlet.

In some embodiments of the programmable basin faucet, the face comprises a temperature display indicating at least one of the set temperature, the water temperature, or the set time, wherein the water temperature indicates a temperature of water dispensed from the programmable basin faucet.

In some embodiments of the programmable basin faucet, the face comprises a capacitive touch surface.

In some embodiments of the programmable basin faucet, the face comprises a pressure-sensitive touch surface.

In some embodiments of the programmable basin faucet, the face is circular.

In some embodiments of the programmable basin faucet, the face is held in the first position with a spring-loaded latch.

In some embodiments of the programmable basin faucet, the face moves from the first position to the second position when the spring-loaded latch is released.

In some embodiments of the programmable basin faucet, the programmable basin faucet comprises a linear actuator configured to move the face between the first position and the second position.

In some embodiments of the programmable basin faucet, the programmable basin faucet comprises a wireless communication device configured to receive a first control signal from a remote device, wherein the first control signal comprises an instruction to control one or more of the set temperature, the water volume, or the set time.

In some embodiments of the programmable basin faucet, the user input device comprises a first temperature-control button; wherein detecting the user input comprises detecting selection of the first temperature-control button; and wherein the one or more processors are configured to, in response to detecting the user input, set the set temperature in accordance with the user input, cause the one or more valves to be adjusted in accordance with the set temperature, and display an indication of the set temperature.

In some embodiments of the programmable basin faucet, the user input device comprises a second temperature-control button; wherein detecting the user input comprises detecting selection of the second temperature-control button; and wherein the one or more processors are configured to, in response to detecting the user input, set the set temperature in accordance with the user input, cause the one or more valves to be adjusted in accordance with the set temperature, and display an indication of the set temperature.

In some embodiments of the programmable basin faucet, the user input device comprises a first water volume control button, wherein detecting the user input comprises detecting selection of the first water volume control button; and wherein the one or more processors are configured to, in response to detecting the user input, set the water volume in accordance with the user input, cause the one or more valves to be adjusted in accordance with the water volume, and dispense the water volume in accordance with the user input.

In some embodiments of the programmable basin faucet, the user input device comprises a second water volume control button, wherein detecting the user input comprises detecting selection of the second water volume control button; and wherein the one or more processors are configured to, in response to detecting the user input, set the water volume in accordance with the user input, cause the one or more valves to be adjusted in accordance with the water volume, and dispense the water volume in accordance with the user input.

In some embodiments of the programmable basin faucet, the user input device comprises a time-control button, wherein detecting the user input comprises detecting selection of the time-control button; and wherein the one or more processors are configured to, in response to detecting the user input, set the time in accordance with the user input, and cause the one or more valves to dispense water at the set time in accordance with the user input.

In some embodiments of the programmable basin faucet, causing the one or more valves to dispense water at the set time in accordance with the user input comprises one of starting water flow at the set time or completing water flow at the set time.

In some embodiments, a basin having a programmable basin faucet is provided, the basin having a programmable basin faucet comprising: a basin; and a programmable basin faucet installed in a side wall of the basin, the programmable basin faucet comprising: a face facing an interior of the basin, wherein the face comprises a user input device configured to detect a user input indicating one or more of a set temperature, a water volume, or a set time; and one or more processors communicatively coupled to the user input device and configured to receive a signal indicating the user input and to responsively, based on the user input, cause one or more valves to be actuated such that water is dispensed from a water outlet of the faucet in accordance with the one or more of the set temperature, the water volume, or the set time, wherein the faucet is configured to be moveable between a first position and a second position with respect to the side wall of the basin, wherein, in the first position, the face is co-planar with a portion of the side wall of the basin, and, in the second position, the face is proud of the portion of the side wall and a circumferential side surface of the faucet extends inwardly from the portion of the side wall into the interior of the basin, the circumferential side surface comprising the water outlet.

In some embodiments of the basin having a programmable basin faucet, the face comprises a temperature display indicating at least one of the set temperature or a water temperature, wherein the water temperature indicates a temperature of water dispensed from the programmable basin faucet.

In some embodiments of the basin having a programmable basin faucet, the face comprises a capacitive touch surface.

In some embodiments of the basin having a programmable basin faucet, the face comprises a pressure-sensitive touch surface.

In some embodiments of the basin having a programmable basin faucet, the face is circular.

In some embodiments of the basin having a programmable basin faucet, the face is held in the first position with a spring-loaded latch.

In some embodiments of the basin having a programmable basin faucet, the face moves from the first position to the second position when the spring-loaded latch is released.

In some embodiments of the basin having a programmable basin faucet, the basin having a programmable basin faucet comprises a linear actuator configured to move the face between the first position and the second position.

In some embodiments of the basin having a programmable basin faucet, the programmable basin faucet comprises a wireless communication device configured to receive a first control signal from a remote device, wherein the first control signal comprises an instruction to control one or more of the set temperature, the water volume, or the set time.

In some embodiments of the basin having a programmable basin faucet, the user input device comprises a first temperature-control button; wherein detecting the user input comprises detecting selection of the first temperature-control button; and wherein the one or more processors are configured to, in response to detecting the user input, set the set temperature in accordance with the user input, cause the one or more valves to be adjusted in accordance with the set temperature, and display an indication of the set temperature.

In some embodiments of the basin having a programmable basin faucet, the user input device comprises a second temperature-control button; wherein detecting the user input comprises detecting selection of the second temperature-control button; and wherein the one or more processors are configured to, in response to detecting the user input, set the set temperature in accordance with the user input, cause the one or more valves to be adjusted in accordance with the set temperature, and display an indication of the set temperature.

In some embodiments of the basin having a programmable basin faucet, the user input device comprises a first water volume control button, wherein detecting the user input comprises detecting selection of the first water volume control button; and wherein the one or more processors are configured to, in response to detecting the user input, cause the one or more valves to be adjusted in accordance with the water volume, and dispense the water volume in accordance with the user input.

In some embodiments of the basin having a programmable basin faucet, the user input device comprises a second water volume control button, wherein detecting the user input comprises detecting selection of the second water volume control button; and wherein the one or more processors are configured to, in response to detecting the user input, cause the one or more valves to be adjusted in accordance with the water volume, and dispense the water volume in accordance with the user input.

In some embodiments of the basin having a programmable basin faucet, the user input device comprises a time-control button, wherein detecting the user input comprises detecting selection of the time-control button; and wherein the one or more processors are configured to, in response to detecting the user input, set the time in accordance with the user input, and cause the one or more valves to dispense water at the set time in accordance with the user input.

In some embodiments of the basin having a programmable basin faucet, causing the one or more valves to dispense water at the set time in accordance with the user input comprises one of starting water flow at the set time or completing water flow at the set time.

In some embodiments, any one or more of the features, characteristics, or elements discussed above with respect to any of the embodiments may be incorporated into any of the other embodiments mentioned above or described elsewhere herein.

BRIEF DESCRIPTION OF THE FIGURES

FIG. 5 shows a basin having a programmable faucet, according to some embodiments.

DETAILED DESCRIPTION

Figure 1A:
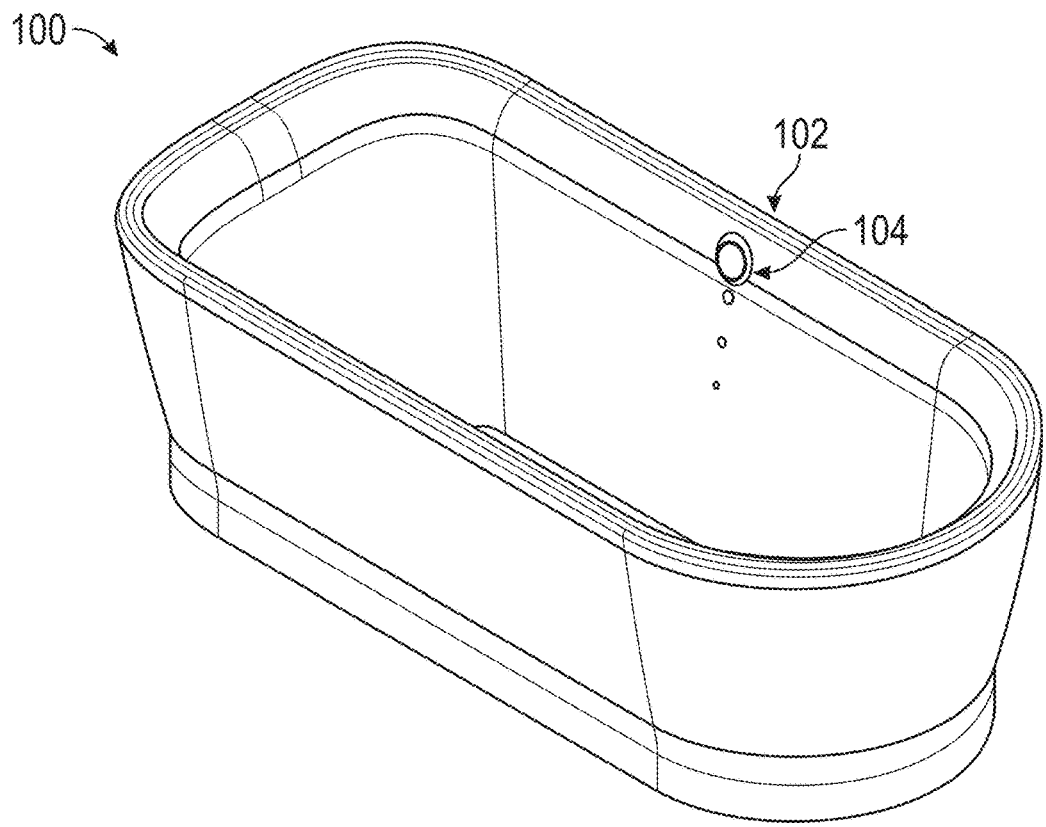
FIG. 1A shows a perspective view of a basin having a programmable faucet, according to some embodiments.

Described herein are basins having programmable faucets. Also provided are programmable faucets for use in basins, such as a bathtub basin. The programmable faucets provided herein can receive a user input indicating a water temperature and/or a water fill volume, for example. In some embodiments, the user input may be received at a user input device located on a surface or face of the programmable faucet. In some embodiments, the user input may be received at a remote device, which can send the user input instructions to the programmable faucet wirelessly. The user input is configured to be received by one or more processors, which can cause a valve to adjust to achieve a water temperature and./or water fill volume in accordance with the user input.

In some embodiments, the programmable basin faucet is configured to move between two different positions—an open position and a closed position. In a closed position, the surface or face of the faucet may be co-planar with a portion of an interior wall of the basin to which the programmable faucet is installed. In an open position, the surface or face is proud of the interior wall of the basin. When in the open position in which the surface/face is proud of the interior wall, a circumferential side surface is exposed, which includes a water outlet. Thus, when the programmable faucet is in the open position, water from a water supply is configured to dispense from the programmable basin faucet to the basin, by way of the water outlet in the circumferential side surface.

Referring now to the drawings, like parts are marked throughout the specification and drawings with the same reference numerals, respectively.

Figure 1B:
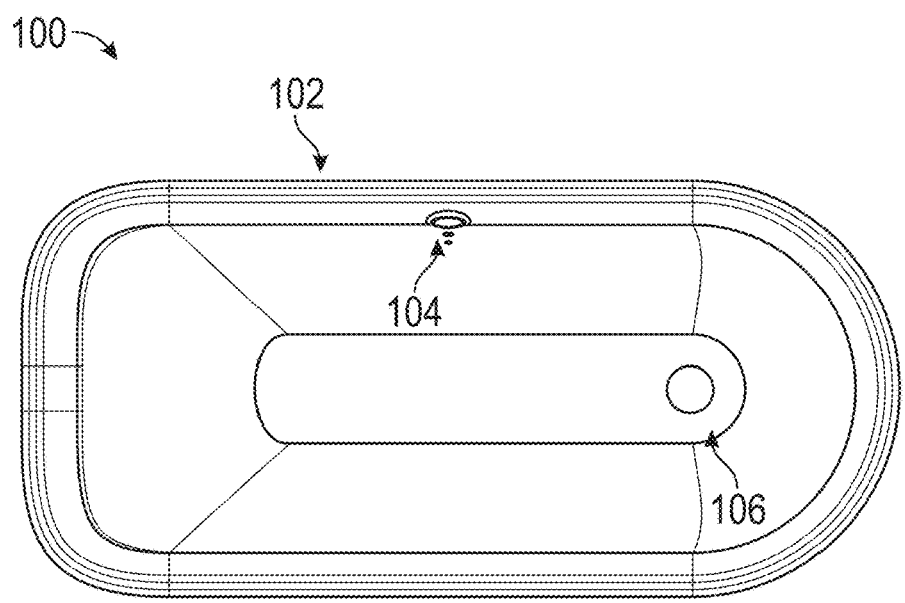
FIG. 1B shows a top view of a basin having a programmable faucet, according to some embodiments.

FIG. 1A shows a perspective view of a basin 100 and FIG. 1B shows a top view of basin 100. As shown, basin 100 includes basin 102, programmable faucet 104, and a drain 106. Programmable faucet 104 may be configured to fluidly connect to a hot water supply and a cold water supply.

Basin 102 may be any type of basin including, but not limited to, a bathtub, a sink, or a drum. In some embodiments, the basin 100 may include a drain 106, as shown in FIG. 1B. In some embodiments, basin 100 may be provided with a programmable faucet 104. In some embodiments, programmable faucet 104 may be provided without basin 100. In such an embodiment, programmable faucet 104 may be configured to be retrofitted to an existing basin 100. For example, programmable faucet 104 may be configured to replace an existing faucet. In some embodiments, the programmable faucet 104 may be installed in addition to an existing faucet.

Figure 2A:
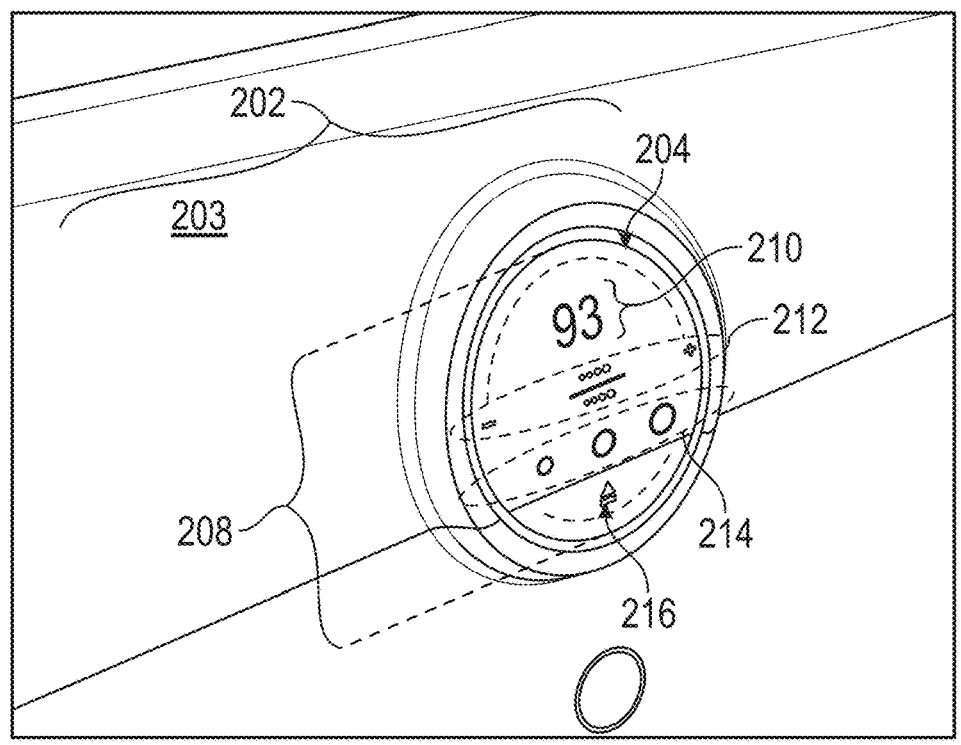
FIG. 2A shows a programmable faucet in a closed position, according to some embodiments.
Figure 2B:
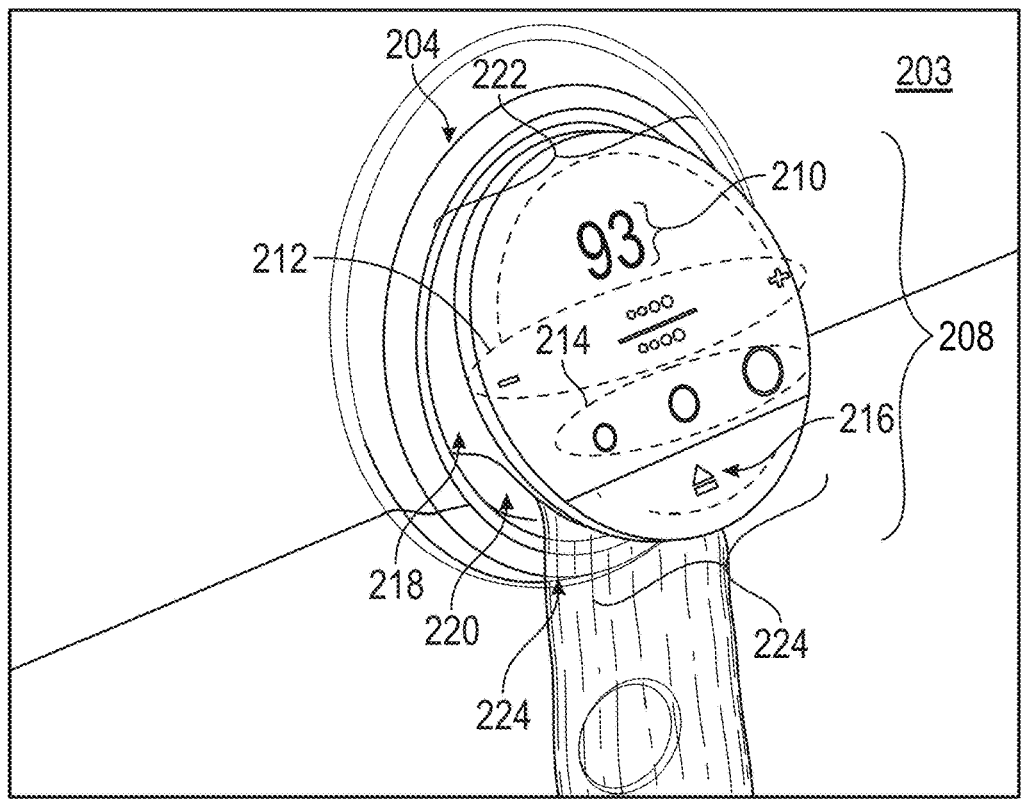
FIG. 2B shows a programmable faucet in an open position, according to some embodiments.

FIGS. 2A and 2B show a close-up view of a programmable faucet 204. Specifically, FIG. 2A shows programmable faucet 204 in a closed position, and FIG. 2B shows programmable faucet 204 in an open position. In the closed position, the face (or surface) 208 of programmable faucet 204 is co-planar with a portion of an interior wall 203 of the basin 202 to which the programmable faucet 204 is installed. In this position, the face/surface 208 faces an interior of the basin. In some embodiments where basin 202 is a bathtub, the closed position of programmable faucet 204 may increase the overall safety of the bathtub. For example, in some embodiments where basin 202 is a bathtub, the closed position of programmable faucet 204 removes the risk of a child hitting his/her head while bathing. In the open position, face 208 sits proud of the interior wall 203 of the basin 202 to which the programmable faucet 204 is installed. When in this proud or open position, a circumferential side or outer surface 218 of programmable is exposed. A water outlet 220 is provided in the circumferential side surface 218, through which water can be dispensed into the basin.

As shown, programmable faucet 204 may include a face (or surface) 208 having a user input device. In some embodiments, the user input device of face 208 may include a water temperature display 210, water temperature control 212, water volume control 214, and/or an outlet control 216. In some embodiments, user input device of face 208 may include a time setting control. As explained above, programmable faucet 204 also includes water outlet 220 through which water may be dispensed into the basin. In some embodiments, the outlet control 216 may allow users to selectively expose the water outlet 220, thereby selectively determining when water may be dispensed into the basin.

In some embodiments, users may directly interact with the face 208 to engage the water temperature control 212, the water volume control 214, and/or the outlet control 216. For example, a user may directly select or otherwise provide an input to the face 208 using a user input device integrated into face 208 of programmable faucet 204. In some embodiments, the programmable faucet 204 may be configured for wireless communication such that users may provide a user input using a remote device. The remote device may then send signal containing instruction according to the user input to a receiver located within programmable faucet 204. The user input (whether provided at the user input device at the face 208 or at a remote device) may provide control of the water temperature control 212, the water volume control 214, and/or the outlet control. In some embodiments, the remote device may include a personal computing device.

In some embodiments, the face 208 may be a capacitive touch screen. In some embodiments, the water temperature control 212, the water volume control 214, and/or the outlet control 216 may be push buttons. In some embodiments, the water temperature control 212, the water volume control 214, and/or the outlet control 216 may be pressure sensors. In some embodiments where the user input device includes a time setting control, the time setting control may comprise one or more push buttons or pressure sensors.

In some embodiments, the water temperature display 210 may be an LED display. In some embodiments, the water temperature display 210 may connect to an internal thermometer which, when the programmable faucet 204 is activated, measures the temperature of the water as it is dispensed. In some embodiments, the water temperature display 210 may show the water temperature rounded to the nearest thousandth of a degree, the nearest hundredth of a degree, the nearest tenth of a degree, the nearest half of a degree, or the nearest degree. In some embodiments, the water temperature display 210 may display the temperature in degree Fahrenheit or in degree Celsius. In some embodiments, the water temperature control 212 may change the water temperature in increments of about 0.1-50, 0.5-5, or 0.5-1° F. In some embodiments, the water temperature control 212 may change the water temperature in increments less than or equal to about 50° F., 20° F., 10° F., 5° F., or 1° F. In some embodiments, the water temperature control 212 may change the water temperature in increments greater than or equal to about 0.1° F., 0.5° F., 1° F., 5° F., or 10° F. In some embodiments, as shown in FIG. 2, water temperature control 212 can include a temperature increase (+) setting and/or a temperature decrease (−) setting.

Water volume control 214 can control the amount of water (i.e. water volume) that is dispensed into basin 202 when the programmable faucet 204 is activated. In some embodiments, the water volume control 214 may include 2-10, or 2-5 water volume settings. In some embodiments, the water volume control 214 may include less than or equal to 10, 8, 5, 4, 3, or 2 water volume settings. In some embodiments, the water volume control 214 may include greater than or equal to 1, 2, 3, 4, 5, or 8 water volume settings. In some embodiments, the different water volume settings of water volume control 214 may each be indicated by differently sized icons to show the relative water volume differences between the available water volume settings.

In some embodiments, the water volume settings may include water volumes between about 0-1000 L, 1-500 L, 15-300 L, or 25-250 L. In some embodiments, the water volume settings may include water volumes of less than or equal to about 1000 L, 500 L, 250 L, 100 L, 75 L, 50 L, or 25 L. In some embodiments, the water volume settings may include water volumes greater than or equal to about 1 L, 5 L, 15 L, 25 L, 50 L, 75 L, 100 L, or 250 L. In some embodiments, the plurality of water volume settings may be programmed into the plurality of water volume controls 214 by the user. In some embodiments, the plurality of water volume settings may be programmed into the plurality of water volume controls 214 by the manufacturer.

In some embodiments, water volume control 214 can include three different water volume settings. For example, three different water volume settings are indicated on the face of programmable faucet 204 of FIG. 2 with three differently sized circles. A user may select any of the three icons to select and control the amount of water that is dispensed into the basin 202. In some embodiments, when three different water volume settings are included, there may be a small, medium, and large water volume setting. In some embodiments, the small water volume setting may be configured to dispense 1-50, 5-40, or 10-30 L of water into basin 202. In some embodiments, the small water volume setting may be configured to dispense less than or equal to about 50, 40, 30, 20, 10, 5, or 1 L of water into basin 202. In some embodiments, the small water volume setting may be configured to dispense more than or equal to about 1, 5, 10, 20, 30, or 40 L of water into basin 202. In some embodiments, the medium water volume setting may be configured to dispense about 10-150, 20-100, or 30-75 L of water into basin 202. In some embodiments, the medium water volume setting may be configured to dispense greater than or equal to about 10, 30, 50, 75, or 100 L of water into basin 202. In some embodiments, the medium water volume setting may be configured to dispense less than or equal to about 150, 125, 100, 75, 50, 40, or 30 L of water into basin 202. In some embodiments, the large water volume setting may be configured to dispense about 50-200 or 75-150 L of water into basin 202. In some embodiments, the large water volume setting may be configured to dispense greater than or equal to about 50, 75, 100, 125, 150, or 175 L of water into basin 202. In some embodiments, the large water volume setting may be configured to dispense less than or equal to about 200, 150, 125, 100, or 75 L of water into basin 202.

In some embodiments, the face 208 may be configured to extend inward at an angle such that the top edge 222 of the face 208 remains close to a portion of the interior wall 203 of the basin 202 and the bottom edge 224 of the face 208 extends inward toward the interior of the basin 202. In some embodiments, the face 208 may be configured to extend inward toward the interior of the basin 202 at an angle of 1-45, 5-30, or 10-20°. In some embodiments, the face 208 may be configured to extend inward toward the interior of the basin 202 at an angle greater than or equal to about 1, 5, 10, 15, 20, 25, 30, 35, or 40°, wherein the vertex of the angle is located along the top edge 222 of the face 208. In some embodiments, the face 208 may be configured to extend inward toward the interior of the basin 202 at an angle less than or equal to about 45, 40, 35, 30, 25, 20, 15, 10, or 5°, wherein the vertex of the angle is located along the top edge 222 of the face 208. In some embodiments, the entirety of the face 208 may be configured to extend inward toward the interior of the basin 202 linearly. In some embodiments, the face 208 may be configured to extend inward toward the interior of the basin by about 0.5-10 or 2-5 cm. In some embodiments, the face 208 may be configured to extend inward toward the interior of the basin by greater than or equal to about 0.5, 1, 2, or 5 cm. In some embodiments, the face 208 may be configured to extend inward toward the interior of the basin by less than or equal to about 10, 5, 3, 2, or 1 cm.

In some embodiments, the movement of the programmable faucet 204 from a first position to a second position may be caused by a user engaging the outlet control 216. In some embodiments, the programmable faucet 204 may be configured to return from the second position, wherein a circumferential outer surface 218 including water outlet 220 is exposed, to the first position, wherein the face 208 is co-planar with a portion of the side wall of the basin 202, when the outlet control 216 is engaged when the programmable faucet 204 is in the second position. In some embodiments, the movement of the programmable faucet 204 from the first position to the second position (and vice versa) may be controlled mechanically. For example, the programmable faucet 204 may move from a first position to a second position when a spring-loaded latch is released by way of engaging outlet control 216, and/or the programmable faucet 204 may move from a first position to a second position when the face 208 is pressed, similar to a retractable pen. In some embodiments, the movement of the programmable faucet 204 from the first position to the second position (and vice versa) may be controlled electronically. For example, the programmable faucet 204 may move from a first position to a second position when a linear actuator is actuated by way of engaging outlet control 216. In some embodiments, programmable faucet 204 may include a hinge mechanism along the top edge 222 of the face 208.

In some embodiments, the surface or face 208 of programmable faucet 204 is round. In some embodiments, the surface or face 208 of programmable faucet 204 is oval, square, rectangular, a pentagon, a hexagon, an octagon, a rounded square, a rounded rectangle, a rounded pentagon, a rounded hexagon, or a rounded octagon.

Figure 3:
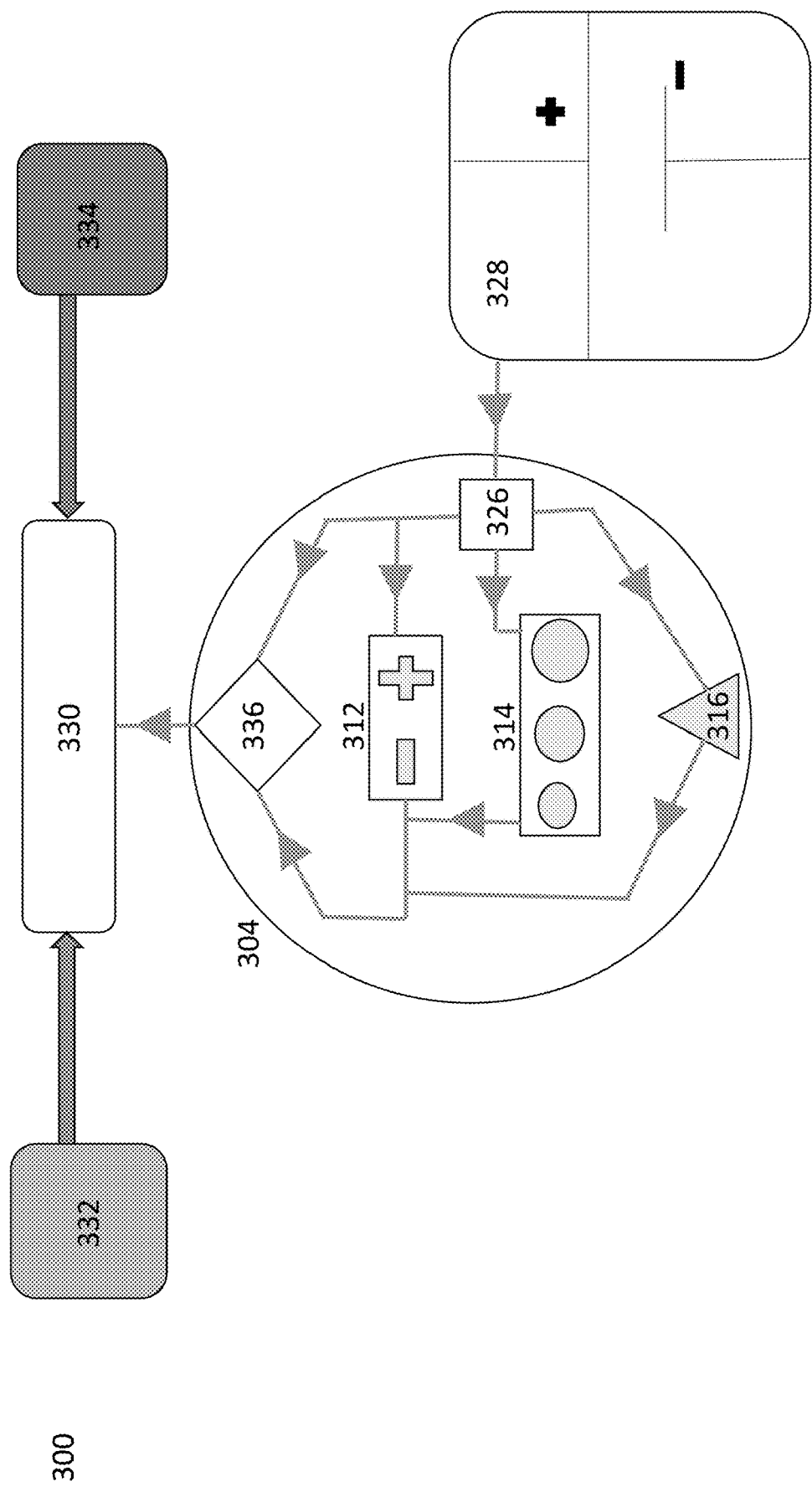
FIG. 3 shows a schematic diagram of the electronic controls of a programmable faucet, according to some embodiments.

FIG. 3 shows a diagram 300 of a programmable faucet 304 having a water temperature control 312, a water volume control 314, and an outlet control 316. As shown, the water temperature control 312 includes a temperature increase (+) setting and a temperature decrease (−) setting, and the water volume control 314 includes three water volume settings indicated by differently sized circles. In some embodiments, programmable faucet 304 may include a time setting control. One or more processors 336 may be communicatively coupled to a user input device, at which water temperature control 312, a water volume control 314, and/or an outlet control 316 may be located. In some embodiments, the user input device comprises a time setting control. In some embodiments, when one of the temperature control 312, water volume control 314, or outlet control 316 are selected by a user, one or more processors 336 may be configured to detect the user input. In some embodiments where the user input device comprises a time setting control, one or more processors 336 may be configured to detect the user input. In response to detecting the user input, the one or more processors 336 may then, upon receipt of an electronic signal, adjust a valve in accordance with the user input to achieve a set temperature, a water volume, or a set time, and/or adjust a linear actuator in accordance with the user input to achieve a first or second position of the programmable basin faucet 304.

As mentioned above, water temperature control 312, water volume control 314, and/or outlet control 316 may be configured to receive user input and then one or more processors 336 may be configured to detect the user input (i.e., receive a signal indicating the user input). In some embodiments, user input device may comprise a time setting control configured to receive user input and then one or more processor 336 may be configured to detect the user input (i.e., receive a signal indicating the user input). In some embodiments, one or more processors 336 may, in response to detecting a user input, adjust a mixing valve 330. Mixing valve 330 may be configured to connect to a cold water supply 332 and a hot water supply 334. In some embodiments, mixing valve 330 may be a solenoid valve. Examples of ways in which processor 336 may control mixing valve 330 are discussed below.

In some embodiments, users may engage or select water temperature control 312 to select the temperature of the water to be deposited from programmable faucet 304. In some embodiments, one or more processors 336 may detect the engaged water temperature control 312 (i.e., receive a signal indicating the user input). The one or more processors may then send an electronic signal to mixing valve 330 to adjust according to instructions provided in the electronic signal (and in accordance with the user input). Specifically, the instructions may cause mixing valve 330 to adjust the amount of hot water relative to the amount of cold water flowing to a mixing chamber to achieve a water temperature in accordance with the user input received at water temperature 312. One or more processors 336 may also send an electronic signal to a display, to display the set temperature or the actual water temperature.

In some embodiments, users may engage or select water volume control 314 to select a desired volume of water to be deposited from programmable basin faucet 304. In some embodiments, one or more processors 336 may detect the engaged water volume control 314 (i.e., receive a signal indicating the user input). The one or more processors 336 may then send an electronic signal to mixing valve 330 to open/close according to instructions provided in the electronic signal (and in accordance with the user input). Specifically, the instructions may cause mixing valve 330 to open/close to align with the user input received at the water volume control 314 and achieve the desired water volume in accordance with the user input.

In some embodiments, users may engage outlet control 316 when they wish to move programmable basin faucet 304 from an open to a closed position, and vice versa. In some embodiments, one or more processors 336 may detect the engaged outlet control 316 (i.e., receive a signal indicating the user input). In some embodiments, the one or more processors 336 may then send an electronic signal to an opening/closing mechanism (e.g., linear actuator) to open/close programmable basin faucet 304 according to instructions provided in the electronic signal (and in accordance with the user input).

In some embodiments, users may engage a time setting control when they wish to select a time of day for the programmable faucet 304 to begin dispensing water (i.e., a time of day for water flow to start). In some embodiments, users may engage a time setting control when they wish to select a time of day for the programmable faucet 304 to stop dispensing water (i.e., a time of day for water flow to stop). In some embodiments, one or more processors 336 may detect the engaged time setting control (i.e., receive a signal indicating the user input). In some embodiments, the one or more processors 336 may then send an electronic signal to mixing valve 330 to open/close at the time of day selected by the user In some embodiments, the controls (e.g., time setting control, water temperature control 312, water volume control 314, and/or outlet control 316) are buttons. In some embodiments, the buttons may be a physically actuable button and/or a capacitive touch or other type of touch-sensitive button. In some embodiments, the buttons may be on a touch-sensitive device and/or a touch-screen display.

As shown, the programmable faucet 304 may include a power control 326 connected to a power supply 328. In some embodiments, power control 326 may be a push button, a capacitive touch sensor, a pressure sensor, or a switch. In some embodiments, engaging power control 326 may cause an electronic circuit to close, thereby allowing programmable faucet 304 to receive power from the power supply 328. In some embodiments, power supply 328 may be an AC power supply. In some embodiments, power supply 328 may be a DC power supply. In some embodiments, power supply 328 may be a battery pack. In some embodiments, programmable faucet 304 may be configured to receive power from an existing power supply 328. In some embodiments, power supply 328 may be provided with the programmable faucet 304. In some embodiments, engaging power control 326 may close an electronic circuit, thereby allowing electricity to flow to water temperature control 312, water volume control 314, and/or outlet control 316. In some embodiments, engaging power control 326 may allow electricity to flow to a time setting control.

Figure 4:
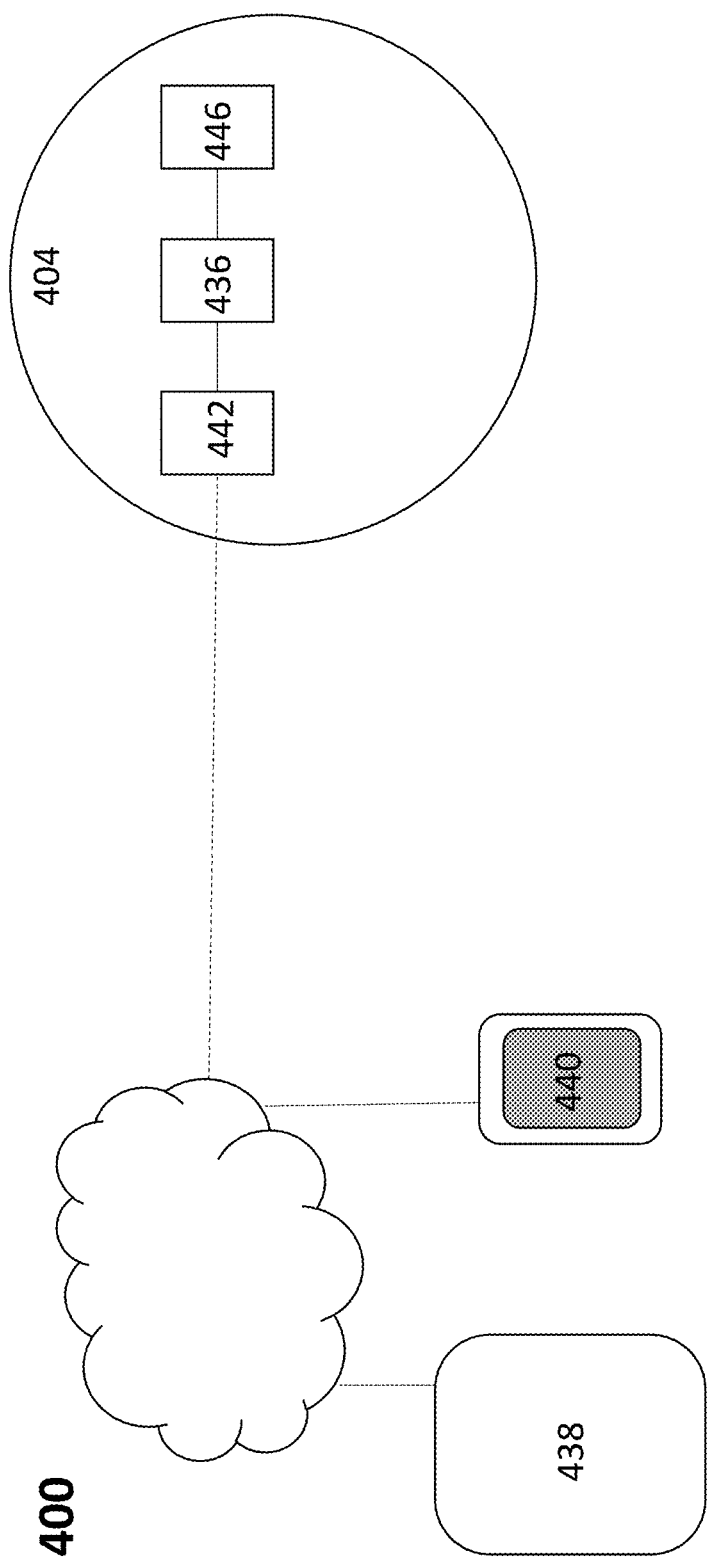
FIG. 4 illustrates a system for controlling a programmable faucet using a network device, according to some embodiments.

FIG. 4 shows a wireless network 400 having a programmable faucet 404 that is configured to send/receive signals from a remote server 438 and/or a user's personal device 440 via wireless network communication (e.g. Bluetooth, WIFI). As shown, programmable faucet 404 includes a receiver 442, one or more processors 436, and a user interface 444. The programmable faucet 404 may include features of the programmable faucets 304, 204, and/or 104 of FIG. 3, FIG. 2, and/or FIG. 1. The one or more processors 436 may include features of one or more processors 336 of FIG. 3. The user interface 444 may include the water volume control, the water temperature control, the power control, the time setting control, and/or the outlet control described in FIGS. 1-3.

In some embodiments, a user may send instructions to the programmable basin faucet 404 via a personal computing device 440. For example, a user may instruct the programmable faucet at 7:00 p.m. to deposit 150 L of 90° F. water into their bathtub at 7:15 p.m. In this example, the user has sent a signal to the programmable basin faucet 404 containing the desired volume of water (e.g., 150 L), desired temperature of water (e.g., 90° F.), and desired time for the tub to begin filling (e.g., 7:15 p.m.). In some embodiments, a user may send the instructions to programmable basin faucet 404 by directly interfacing with the user interface 444 (e.g., by pressing a plurality of push button controls located on the faucet). For example, a user may engage a time setting control to instruct the programmable basin faucet 404 to begin filling at 7:15 p.m. They may engage a water volume control to instruct the programmable basin faucet 404 to deposit 150 L of water and/or a water temperature control to instruct the programmable basin faucet 404 to ensure the water temperature of the deposited water is 90° F. In some embodiments, if user instructions are to be executed at a later time, the instructions may be stored on the remote server 438 before being sent to the programmable faucet 404 at the appropriate time. In some embodiments, the programmable basin faucet 404 receives instructions from the user at receiver 442. The receiver 442 may transmit the instructions to the processor 436, which may cause the programmable faucet 404 to execute the instructions. In some embodiments, the programmable faucet 404 may notify the user via their personal computing device 440 when said instructions have been executed.

FIG. 5 shows a bathtub 500 having a basin 502 and a programmable faucet 504. As shown, programmable faucet 504 includes face 508 comprising a water temperature display 510 as well as a plurality of controls 550. The programmable faucet 504 may include features of the programmable faucets 404, 304, 204, and/or 104 of FIGS. 1-4. The plurality of controls 550 may include a water temperature control, a water volume control, a time setting control and/or an outlet control.

The foregoing description sets forth exemplary systems, methods, techniques, parameters, and the like. It should be recognized, however, that such description is not intended as a limitation on the scope of the present disclosure but is instead provided as a description of exemplary embodiments.

Although the description herein uses terms first, second, etc. to describe various elements, these elements should not be limited by the terms. These terms are only used to distinguish one element from another.

The invention claimed is:

1. A programmable basin faucet, comprising:
a face configured to be disposed on a side wall of a basin such that the face faces an interior of the basin, wherein the face comprises a user input device configured to detect a user input indicating one or more of a set temperature, a water volume, or a set time; and
one or more processors communicatively coupled to the user input device and configured to receive a signal indicating the user input and to responsively, based on the user input, cause one or more valves to be actuated such that water is dispensed from a water outlet of the faucet in accordance with the one or more of the set temperature, the water volume, or the set time,
wherein the faucet is configured to be moveable between a first position and a second position with respect to the side wall of the basin, wherein, in the first position, the face is co-planar with a portion of the side wall of the basin, and, in the second position, the face is proud of the portion of the side wall and a circumferential side surface of the faucet extends inwardly from the portion of the side wall into the interior of the basin, the circumferential side surface comprising the water outlet.

2. The programmable basin faucet of claim 1, wherein the face comprises a temperature display indicating at least one of the set temperature, the water temperature, or the set time, wherein the water temperature indicates a temperature of water dispensed from the programmable basin faucet.

3. The programmable basin faucet of claim 1, wherein the face comprises a capacitive touch surface.

4. The programmable basin faucet of claim 1, wherein the face comprises a pressure-sensitive touch surface.

5. The programmable basin faucet of claim 1, wherein the face is circular.

6. The programmable basin faucet of claim 1, wherein the face is held in the first position with a spring-loaded latch.

7. The programmable basin faucet of claim 6, wherein the face moves from the first position to the second position when the spring-loaded latch is released.

8. The programmable basin faucet of claim 1, comprising a linear actuator configured to move the face between the first position and the second position.

9. The programmable basin faucet of claim 1, wherein the programmable basin faucet comprises a wireless communication device configured to receive a first control signal from a remote device, wherein the first control signal comprises an instruction to control one or more of the set temperature, the water volume, or the set time.

10. The programmable basin faucet of claim 1, wherein the user input device comprises a first temperature-control button; wherein detecting the user input comprises detecting selection of the first temperature-control button; and wherein the one or more processors are configured to, in response to detecting the user input, set the set temperature in accordance with the user input, cause the one or more valves to be adjusted in accordance with the set temperature, and display an indication of the set temperature.

11. The programmable basin faucet of claim 1, wherein the user input device comprises a second temperature-control button; wherein detecting the user input comprises detecting selection of the second temperature-control button; and wherein the one or more processors are configured to, in response to detecting the user input, set the set temperature in accordance with the user input, cause the one or more valves to be adjusted in accordance with the set temperature, and display an indication of the set temperature.

12. The programmable basin faucet of claim 1, wherein the user input device comprises a first water volume control button, wherein detecting the user input comprises detecting selection of the first water volume control button; and wherein the one or more processors are configured to, in response to detecting the user input, set the water volume in accordance with the user input, cause the one or more valves to be adjusted in accordance with the water volume, and dispense the water volume in accordance with the user input.

13. The programmable basin faucet of claim 1, wherein the user input device comprises a second water volume control button, wherein detecting the user input comprises detecting selection of the second water volume control button; and wherein the one or more processors are configured to, in response to detecting the user input, set the water volume in accordance with the user input, cause the one or more valves to be adjusted in accordance with the water volume, and dispense the water volume in accordance with the user input.

14. The programmable basin faucet of claim 1, wherein the user input device comprises a time-control button, wherein detecting the user input comprises detecting selection of the time-control button; and wherein the one or more processors are configured to, in response to detecting the user input, set the time in accordance with the user input, and cause the one or more valves to dispense water at the set time in accordance with the user input.

15. The programmable basin faucet of claim 14, wherein causing the one or more valves to dispense water at the set time in accordance with the user input comprises one of starting water flow at the set time or completing water flow at the set time.

16. A basin having a programmable basin faucet, comprising:
a basin; and
a programmable basin faucet installed in a side wall of the basin, the programmable basin faucet comprising:
a face facing an interior of the basin, wherein the face comprises a user input device configured to detect a user input indicating one or more of a set temperature, a water volume, or a set time; and
one or more processors communicatively coupled to the user input device and configured to receive a signal indicating the user input and to responsively, based on the user input, cause one or more valves to be actuated such that water is dispensed from a water outlet of the faucet in accordance with the one or more of the set temperature, the water volume, or the set time,
wherein the faucet is configured to be moveable between a first position and a second position with respect to the side wall of the basin, wherein, in the first position, the face is co-planar with a portion of the side wall of the basin, and, in the second position, the face is proud of the portion of the side wall and a circumferential side surface of the faucet extends inwardly from the portion of the side wall into the interior of the basin, the circumferential side surface comprising the water outlet.

17. The basin having a programmable basin faucet of claim 16, wherein the face comprises a temperature display indicating at least one of the set temperature or a water temperature, wherein the water temperature indicates a temperature of water dispensed from the programmable basin faucet.

18. The basin having a programmable basin faucet of claim 16, wherein the face comprises a capacitive touch surface.

19. The basin having a programmable basin faucet of claim 16, wherein the face comprises a pressure-sensitive touch surface.

20. The basin having a programmable basin faucet of claim 16, wherein the face is circular.

* * * * *